United States Patent Office 2,754,960
Patented July 17, 1956

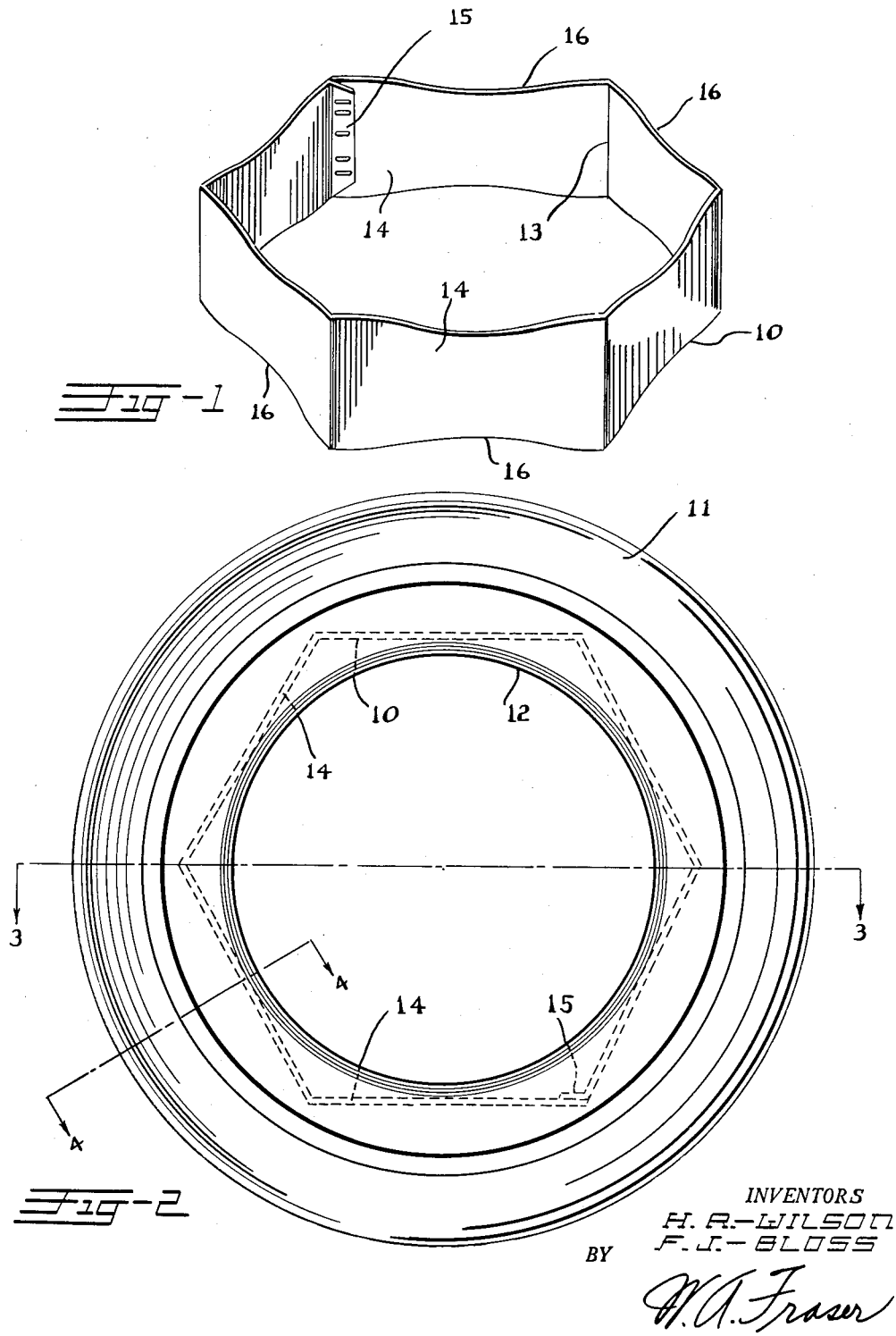

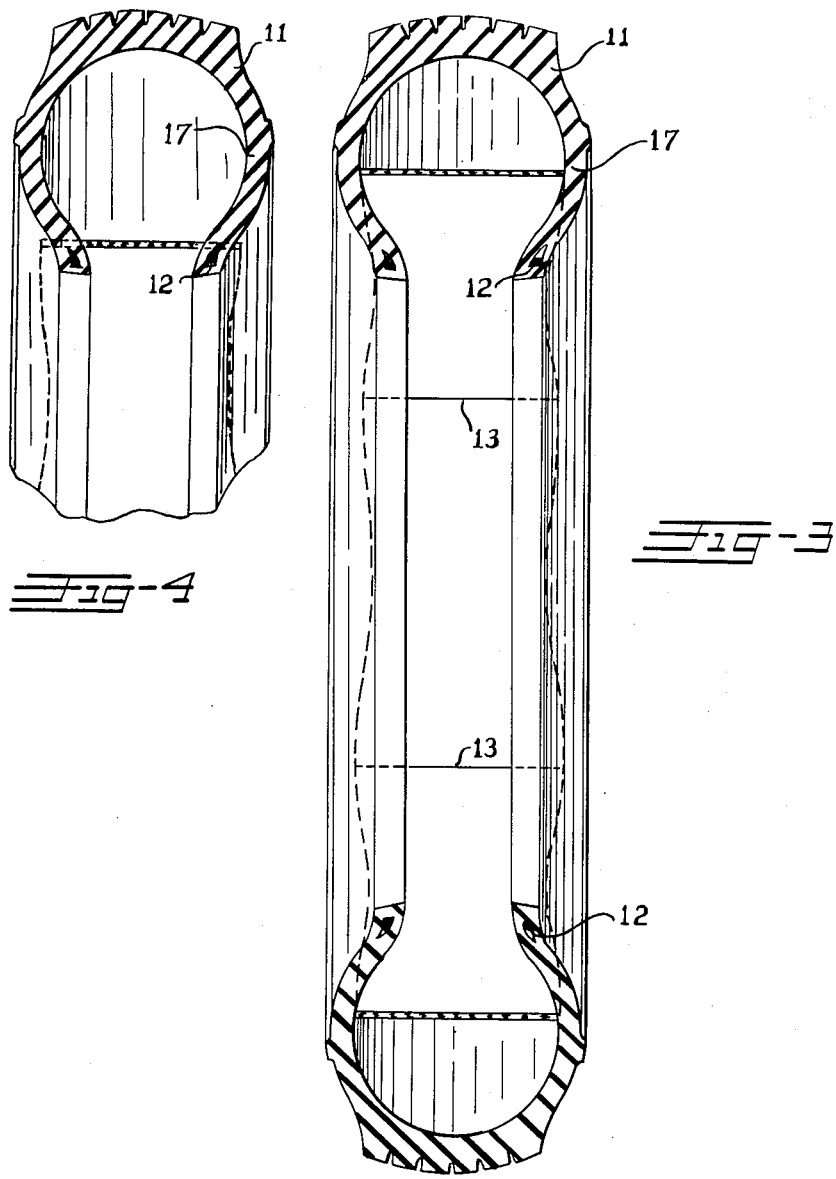

2,754,960

BEAD SPACER FOR TUBELESS TIRES

Hubert R. Wilson, Clinton, and Frederick J. Bloss, Akron, Ohio, assignors to The Firestone Tire & Rubber Company, Akron, Ohio, a corporation of Ohio Application April 1, 1953, Serial No. 346,245

3 Claims. (Cl. 206—46)

This invention relates to tubeless tires and more particularly to means for holding the beads of tubeless tires spaced apart during shipping and storage to facilitate the mounting and inflation of such tires on rims.

Tubeless tires present a problem of inflation if the beads of the tire are pressed closed together as the result of piling the tires in tiers during shipping and storage. The tire beads tend to "set" in this compressed position and when a tire is mounted on a drop-center rim, the beads tend to remain in the well of the rim spaced from the bead seats. The result is that an initial seal cannot be easily obtained and inflationary air tends to be lost as fast as it enters the tire.

To prevent this condition, the present invention provides a corrugated board spacer in the shape of a flat strip folded to form a polygon having a perimeter substantially greater than the inside perimeter of the tire beads. The edges of the sides of the polygon are curved concavely so as to fit snugly against the interior walls of the tire. The strip is thus adapted to be inserted completely within the interior of the tire and to be wedged in position between the sidewalls of the tire in a manner to hold the beads spaced apart by the required amount. The spacer is cheap and easy to make, is mechanically strong and is effective for the desired purpose.

It is accordingly an object of the present invention to provide a spacer for the beads of a tubeless tire which will hold the beads apart until the time of use and prevent them from taking a "set" in a closely spaced position.

Another object is to provide a spacer for the beads of a tubeless tire which is cheap and easy to make.

Another object is to provide a spacer for tubeless tires comprising a corrugated board strip which can be easily inserted and removed in a tubeless tire.

Further objects and advantages will more fully appear from the following description of a preferred form of the invention, reference being had to the accompanying drawings in which:

Figure 1 is a perspective view of a corrugated board spacer embodying the invention;

Figure 2 is a sectional view of a tubeless tire showing the spacer of Figure 1 installed therein;

Figure 3 is a transverse sectional view taken in the plane 3—3 of Figure 2; and

Figure 4 is a transverse sectional view taken in the plane 4—4 of Figure 2.

Now referring to the drawing, the invention is shown as embodied in a spacer, indicated generally at 10, which is adapted to be inserted within a tubeless tire 11 to hold the beads 12 spaced apart. The spacer preferably comprises a flat strip of corrugated board folded about transversely extending lines 13 to form a hexagon, the sides of which are indicated at 14. The hexagon is closed by stapling a flap 15 at one end of the strip to the other end of the strip as shown. The edges 16 of the sides of the hexagon are cut away so each side has a concave curved shape giving the spacer a scalloped appearance as shown in Figure 1. As will be apparent later, the curvature of the edges 16 is such as to enable the edges to conform closely at every point to the interior surfaces of the sidewalls 17 of the tire 11 with the corners of the hexagon contacting the sidewalls at about their center portions, that is, at the point of widest sidewall spacing and with the center portions of the edges contacting the tire sidewalls immediately adjacent the bead portions 12 of the tire at about the position of the closest spacing of the sidewalls. The width of the strip is such as to space the beads by an amount substantially equal to or perhaps slightly greater than the bead spacing of the tire when it is mounted on a rim.

In order to insert the spacer within the tire 11, the beads 12 are spread apart, the spacer is partially collapsed by folding along the corners, and the partially collapsed spacer is inserted bodily within the tire and then expanded fully to the position of Figure 2. When the tire beads are released, their tendency to take a closely spaced position clamps the spacer securely within the tire. Since the corners of the spacer have a width substantially equal to the greatest spacing of the sidewalls, the spacer cannot be dislodged from its wedged position unless the beads are spread widely apart and unless, in addition, the diagonal spacer is partially collapsed. This does not happen in shipping and storage, and as a result the spacer is held securely within the tire until it is deliberately removed.

It will be observed that the sidewalls 17 are held in a spaced apart position by contact with the spacer throughout the length of its peripheral edges 16. This is in contrast to the spacers of the prior art which provide wedging support to the sidewalls and beads only at spaced points. The spacer is thus much stronger and more effective than those of the prior art. Furthermore, the spacer by being held entirely within the interior of the tire does not have protruding edges or tabs which would tend to become snagged and dislodged when the tire is handled.

Although the invention is shown in hexagonal form, other polygonal shapes may be used without sacrificing the advantages of the invention and without departing from the scope of the present invention, the essential features of which are summarized in the claims below.

What is claimed is:

1. In combination, an open bellied tire and a spacer inserted bodily within said tire to hold the sidewalls and the beads of said tire in spaced apart relation, said spacer comprising a flat strip of substantially stiff material folded about lines extending transversely of the strip to form a polygon, the edges of the sides of said polygon from corner to corner having a concave configuration, the spacer contacting and supporting the surface of the belly of the tire at every point along said edges, the centers of the edges of the sides of said polygon contacting the surface of the belly of the tire adjacent the beads, and the corners of said polygon contacting the surface of the belly of the tire at points removed from said beads.

2. In combination, an open bellied tire and a spacer inserted bodily within said tire to hold the sidewalls and the beads of said tire in spaced apart relation, said spacer comprising a flat strip of stiff material folded about lines extending transversely of the strip to form a polygon, the edges of said polygon being contoured inwardly between adjacent corners of the polygon, the inner surface of the belly of the tire bearing on said edges at substantially every point thereon, the centers of the sides of said polygon contacting the surface of the belly of the tire adjacent the beads thereof, and the corners of said polygon contacting the surface of the belly of the tire at points removed from the tire beads.

3. In combination, an open bellied tire and a spacer inserted bodily within said tire to hold the sidewalls and the beads of said tire in spaced apart relation, said spacer comprising a flat strip of relatively stiff material folded about lines extending transversely of the strip to form a polygon, the sides of said strip being scalloped, said spacer contacting the surface of the belly of said tire at every point along said edges whereby the beads of the tire are maintained in constant axial relation.

References Cited in the file of this patent

UNITED STATES PATENTS

| | | |
|---|---|---|
| 1,388,840 | Angier | Aug. 30, 1921 |
| 1,504,733 | Angier | Aug. 12, 1924 |
| 1,821,307 | Howland | Sept. 1, 1931 |
| 2,304,373 | Palmer | Dec. 8, 1942 |
| 2,573,664 | Herzegh | Oct. 30, 1951 |